United States Patent [19]

Jack et al.

[11] 4,265,938
[45] May 5, 1981

[54] RETRO-REFLECTING SHEET MATERIAL AND METHOD OF MAKING SAME

[75] Inventors: Stanton E. Jack; Robert O. Dark, both of Kingston, Canada

[73] Assignee: Alcan Research & Development Limited, Montreal, Canada

[21] Appl. No.: 75,007

[22] Filed: Sep. 13, 1979

[30] Foreign Application Priority Data

Sep. 21, 1978 [CA] Canada ................................. 311780

[51] Int. Cl.³ ...................... G02B 5/128; B05D 5/06; B05D 7/14
[52] U.S. Cl. ..................................... 427/163; 350/105
[58] Field of Search ......................... 427/163; 350/105

[56] References Cited

U.S. PATENT DOCUMENTS

| | | | |
|---|---|---|---|
| 2,407,680 | 9/1946 | Palmquist et al. | 350/105 |
| 2,543,800 | 3/1951 | Palmquist et al. | 350/105 |
| 3,922,433 | 11/1975 | Patterson et al. | 428/334 |

Primary Examiner—James R. Hoffman
Attorney, Agent, or Firm—Cooper, Dunham, Clark, Griffin & Moran

[57] ABSTRACT

The specification relates to retro-reflectors of the type used for road signs and markers and vehicle license plates to make these objects more noticeable to road users after dark. In the invention, the surface of a metal substrate is made retro-reflective by applying a layer of an organic polymeric material and adhering glass beads thereto, and then passing the substrate through a roller mill or the like with the glass beads covered by a platen so that the beads form indentations in the metal surface. The presence of the platen allows the pressing (indentation) step to take place without damage to the glass beads or to the layer between the beads and the metal surface. By this means, a hard metal article can be made directly retro-reflective.

13 Claims, 19 Drawing Figures

RETRO-REFLECTING SHEET MATERIAL AND METHOD OF MAKING SAME

BACKGROUND OF THE INVENTION

This invention relates to retro-reflective sheet material (also known as reflex reflectors) and to a method of preparing the same.

Retro-reflective material is well known and widely used in the prior art, mainly in connection with road signs and automobile licence plates and the like. The material is capable of reflecting an incident beam of light back in the general direction of the light source. When, for example, a car headlight illuminates a road sign bearing such material in otherwise dark surroundings, the sign reflects a greater amount of light towards the driver than surrounding objects and is therefore clearly visible.

Known retro-reflective materials fall into two general types. The first type consists of spherical glass beads adhered to the surface of a transparent organic coating applied over a reflective metal (or other) substrate but only partially imbedded in it so that a glass-air interface is presented to incoming light. This type of material does not function as a retro-reflector when the surface is wet with water.

The second type of material consists of high refractive index (about 1.9 and greater) glass beads suspended within a relatively thick film of a transparent organic coating (plastic film) applied over a reflective metal substrate. Such material retains its retro-reflective properties when wet.

Theoretical considerations dictate that the most effective retro-reflectors of the second type can be formed by positioning the glass beads at just the right distance from conforming segments of concave spherical mirrors of corresponding size located behind the individual beads. This optimum distance will vary depending on the diameter of the beads, their refractive index, and the refractive index of the medium in which they are suspended.

Various known retro-reflectors embody such a structure but have generally been produced in the form of flexible tapes or sheets which are adhered to the desired object, such as a road sign. The step of adhering the tape to the object can be time consuming and uneconomical, and the tape may peel from the object after a period of exposure to the elements.

One example of known retro-reflectors is disclosed in U.S. Pat. No. 2,407,680 issued on Sept. 17, 1946 and assigned to Minnesota Mining and Manufacturing Company. This patent was one of the first to disclose the second type of structure referred to above employing high refractive index spheres, and it is to be noted that it suggests the use of a polished metal surface as the back reflector with the beads spaced an optimum distance therefrom. The patent also suggests the formation of concave mirrors in a reflective surface formed by a reflective binder layer for the heads.

U.S. Pat. No. 2,543,800 issued on Mar. 6, 1951 and assigned to Minnesota Mining and Manufacturing Company discloses a retro-reflector in which the beads are spaced a small distance from corresponding reflector surfaces formed by pressing the beads partially into a moldable cushion layer having a reflective surface coating containing metallic flake pigment particles, the beads being spaced from the cushion layer by a thin film which may contain a transparent pigment. After the pressing operation the plastic layers are cured. One disadvantage of such retro-reflectors is that the reflector surfaces formed by the cushion layer are not as reflective as a polished metal surface and therefore light is lost at these surfaces.

U.S. Pat. No. 3,922,433 issued on Nov. 25, 1975 and assigned to Aluminum Company of America relates to partially embedding the spherical glass beads into a metallic coating while it is in the molten condition. This invention is an attempt to form a retro-reflective surface directly on a substrate made of a hard material, such as a road sign, without first forming a flexible tape to be adhered thereto. An iron-base substrate is dipped into a molten bath of aluminum, zinc, tin, lead or alloys thereof and is sprayed with the glass beads by an air gun as the substrate is withdrawn from the bath and the coating is still molten. This method has the disadvantages that it is expensive and the beads are not spaced from the reflective surface as is required for the optimum retro-reflection.

There is therefore a need for a method of producing a retro-reflective surface directly onto hard metal substrates, which method permits the beads to be spaced by the optimum distance from conforming concave reflective surfaces.

The formation of a plastic layer containing the glass beads and the pressing of the beads into the metal substrate has been contemplated but, because of the relative hardness of the substrate surface, it has been found that the beads tend to shatter and the layer of plastic between the beads and the substrate surface tends to become attenuated or damaged when the plastic layer is rolled with sufficient force to cause the beads to indent the substrate surface. Moreover, the beads tend to become mis-aligned with the indentations in the surface so that a useless product is produced.

SUMMARY OF THE INVENTION

It has now unexpectedly been found that a product of high quality can be produced by indenting the substrate surface by applying pressure to the glass beads when a platen is located between the surface of the layer containing the glass beads and a roller or the like used for applying said pressure.

Thus, according to one aspect of the invention, there is provided a method of forming a retro-reflective surface on an indentable metal substrate, comprising the steps of: (a) forming on said indentable metal substrate a layer of transparent organic polymeric material having a mono-layer coating of substantially spherical glass beads of high refractive index; (b) covering said beads with a platen having substantially no tendency to adhere to the glass beads under the pressures encountered; (c) applying sufficient pressure to said platen and indentable metal substrate to cause the glass beads to indent the surface of said indentable metal substrate; and (d) covering said beaded layer with a further layer of transparent organic polymeric material; said transparent organic polymeric material formed on the indentable metal substrate in step (a) being suitable to withstand the pressure of step (c) without substantial crazing, cracking or attenuation, and the thickness of said layer being sufficient to space said beads from said substrate by a predetermined distance suitable for retro-reflection after step (c).

According to another aspect of the invention there is provided a retro-reflector comprising an indentable metal substrate, a layer of transparent organic polymeric material overlying a surface of the substrate, a mono-layer of glass beads of high refractive index separated from said substrate by said layer of transparent organic polymeric material, and a further layer of transparent organic polymeric material overlying said mono-layer of glass beads, the surface of said substrate having indentations conforming to the adjacent glass beads, and the separation of the glass beads from the conforming indentations being sufficient for retro-reflection.

When a platen is used in the indentation step, it is found that, despite the large pressure or force required to force the glass beads to indent the substrate surface, the glass beads remain largely undamaged and the layer between the beads and the substrate is not significantly damaged or compressed.

The effectiveness of the platen is quite unexpected because the damage to the glass beads and misalignment of the beads with the conforming convex mirrors encountered in original attempts to form retro-reflective surfaces on hard substrates was believed to be due to the load required to force each bead to indent the substrate material via the intervening polymer layer. If a platen is used, the beads must be subject to the same loading in order to cause proper indentation, so it was unreasonable to expect a platen to prevent damage to the beads.

The platen may take the form of any resilient or deformable material having substantially no tendency to adhere to the glass beads during the indentation step. The material of the platen should be sufficiently soft to be indented either elastically or plastically by the glass beads during the indenting step, but of course should be capable of transmitting sufficient force to the beads to cause the necessary identation of the substrate.

Thus the platen may be a plate or sheet of aluminum or other metal. It has also unexpectedly been found that the platen can be a thin foil or web of metal or paper or similar material. Such thin foils or webs are particularly advantageous because they can be withdrawn from a roll of the material and passed virtually continuously through a roll mill with the beaded substrate. This makes the manufacture of the retro-reflective substrate economical particularly as the foil or web-like platens are themselves inexpensive.

Although the use of a platen eliminates damage to the glass beads during the indentation step in the case of most metal substrates, some substrates (especially ferrous metals) are so hard that the loading required to produce indentation cannot be transmitted by the beads without considerable damage, even when a platen is used. These substrates can easily be identified from hardness tables and from simple trial and error. It is not possible to provide a maximum hardness limit beyond which the method of the invention cannot be effectively operated, because the limit varies somewhat with the particular type of pressing equipment, glass beads, platens, operating speeds, etc. However, as stated, the useful metal substrates will be readily identifiable by persons skilled in this technology. The term "indentable metal substrate" is used throughout this specification to refer to those substrates which can be used in the method of the invention, i.e., those having a hardness below the practical maximum hardness limit in the particular operating conditions.

Very hard metals can be provided with a retro-reflective surface if the hard metals are first coated or "clad" with a softer metal because only the hardness of the surface layer of the substrate is important in the indentation step. The term "indentable metal substrate" therefore includes such structures.

It is also to be noted that the term "transparent" is used in a wide sense throughout this specification and is intended to include materials that are sometimes referred to as semi-transparent. The important point is that the various layers overlying the substrate, and even the glass beads themselves, must be capable of transmitting sufficient light for the structure to function effectively as a retro-reflector. Any layer of material (e.g., pigment or dye) capable of transmitting sufficient light to achieve this function is considered to be "transparent" in the context of this invention.

BRIEF DESCRIPTION OF THE DRAWINGS

The invention is described in more detail below in which reference is made to the preferred embodiments of the invention and to the accompanying drawings, in which.

DETAILED DESCRIPTION

Figure 1:
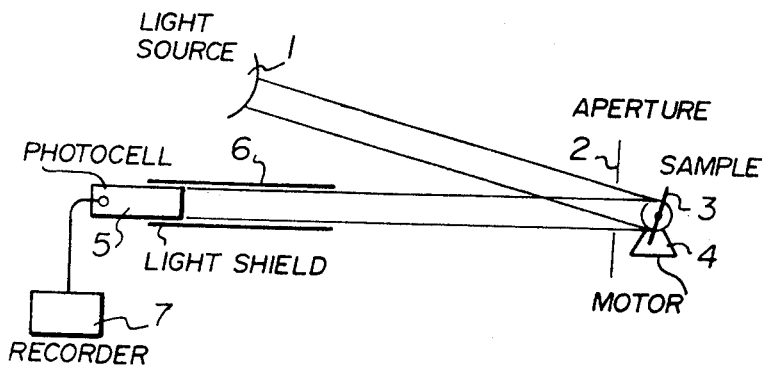
FIG. 1 is a diagram showing the apparatus used to measure the retro-reflective properties of various samples according to the invention and control samples.

In the preferred method of the present invention, a metal substrate having a retro-reflective surface can be prepared without carrying out the disadvantageous steps of first forming an adhesive tape having the retro-reflective characteristics followed by adhering the tape to the substrate.

The indentable metal substrate is preferably first coated with a transparent layer of an organic polymeric material and the layer is allowed to harden or is cured. A second layer of an organic material is then applied as an adhesive material. Small glass beads are applied to the adhesive surface to form a mono-layer, the beads being as densely packed on the surface as possible. The adhesive is allowed to harden or is cured. By proper choice of the transparent organic polymeric material, it is also possible to combine in one layer the functions of space coat and adhesive. In this case, the first layer is partially dried or cured to a degree at which the glass beads applied to the surface will adhere to form a monolayer but will not sink excessively into the polymeric material before it can be completely cured or dried. Thus the required separation between beads and substrate is preserved.

However formed, the structure is pressed in a mill so that the surface of the metal substrate is indented by the glass beads. Although the glass beads cause the metal substrate to form indentations, the beads themselves do not directly contact the substrate and remain spaced therefrom by the polymer layer. The pressure applied to the beads during the indentation step is thus transmitted to the substrate layer via the polymer layer and is sufficient to cause concave deformations to form in the substrate metal.

By using a platen between the glass beads and the pressing roll or the like, it has been found that suitable indentation of the surface can be obtained with little or no damage to the glass beads or to the transparent layer separating the beads from the surface of the substrate despite the considerable pressure required to obtain the indentation.

It is not completely clear why the presence of a platen prevents damage to the retro-reflective structure but this may be because the platen acts as a cushion and, by spreading out the load, reduces the unit pressure on the glass bead surfaces. Alternately, or in addition, the platen may avoid the relative motion between the beads and the pressure roll, or the like, which exists when no platen is used. Whichever mechanism is effective, the requirement for a platen was quite unexpected and its effectiveness in preventing damage to the glass beads and polymer layers is remarkable.

After the indentation step, the glass beads are covered with one or more layers of a transparent organic polymeric material and cured or allowed to harden. The extra layer protects the glass beads and provides a flat outer surface. If the extra layer is omitted, a structure of the first type mentioned earlier would be produced which would lose its retroreflective properties when wet with water.

Any one of the layers of organic polymeric material may contain a pigment in order to impart a colour to the retro-reflective surface. The pigment should preferably be light fast and not heat sensitive. Clear pigments give the best results, although any stable type of pigment can by employed provided the resulting pigmented layer remains transparent in the sense defined earlier in this specification.

The following general points should be considered when preparing retro-reflective substrates according to this invention:

(i) The refractive index and size of the glass beads affects the optimum distance that the beads should be spaced from the substrate (i.e., smaller beads and higher refractive indices require smaller optimum spacings from the substrate);

(ii) The rolling pressure applied to a given substrate metal affects the size of the angle of incidence for effective retro-reflection (the greater the pressure, the more the beads are indented into the substrate and the greater is the angle of effective retro-reflection); and (iii) The layers of polymeric material applied over the glass beads after the indentation step should preferably be just sufficient to produce a flat surface because thicker layers reduce the intensity of the reflected light.

The indentable metal substrates are usually metals suitable for preparing objects such as road signs and markers and automobile licence plates. Softer metals are preferred in order to reduce the pressures required in the indentation step. Aluminum is the preferred material, although zinc-coated iron-base material has also proved very effective. The preferred aluminum alloys are soft alloys such as AA1100, although harder alloys like Alcan SW-30 (An Al-$\frac{1}{2}$% Mn type alloy) and AA5454 (having a hardness of 85 BHN) can also be used. Since the angles of incidence at which retro-reflectivity takes place may be reduced to some extent when harder substrates are employed because of reduced indentation of the metal, it may be desirable in those applications where a very hard aluminum substrate is required to employ a clad substrate, i.e., a hard aluminum alloy as a core material and a softer alloy as a cladding.

Although, as stated above, there is an upper limit on the hardness of the substrates beyond which the method of the invention may not be effective, there is no effective lower limit on the hardness of the substrates and very soft metals or metal foils can be employed if desired. The use of a platen is advantageous even in those cases in which the metal substrate may be soft enough to be indented at pressures unlikely to produce significant bead damage, because bead misalignment or displacement may still be caused if the substrates are indented without the use of a platen.

The glass beads preferably have diameters in the range 50 to 80 microns and are of high refractive index e.g., 1.9 and higher. Glass beads obtainable from Flex-O-Lite Division of General Steel Industries Limited, St. Louis, U.S.A. under the designation Type 910-18 are found to be useful. These beads have diameters of about 75 microns and a refractive index of 2.1.

Examples of other suitable glass beads are Type 831 (refractive index 1.9), Type 938 (refractive index 2.28) and Fol Glass 1020 (refractive index 2.24) all available from Flex-O-Lite, and UGB 2.32 Toshiba from Wanami Abrasive Company Ltd., Tokyo, Japan.

As noted above, the lower the refractive index of the glass, the greater is the required thickness of the "space coat" (i.e., the first layer of organic polymeric material). The size of the beads is also a factor in determining the thickness of the space coat. For example:

(i) beads of 1.9 refractive index and screen size 200/270 (50–80$\mu$) require a space coat 22–25$\mu$ in thickness;

(ii) beads of 2.1 refractive index and screen size 200/270 require a space coat of 12–15$\mu$ in thickness;

(iii) beads of 2.24 and 2.28 refractive index and 230/270 screen size require a space coat of 10–12$\mu$ in thickness;

(iv) beads of 2.32 refractive index and 230–325 screen size require a space coat 8–10$\mu$ in thickness.

The required thickness of the space coat for each refractive index and bead size will be apparent to a person skilled in the art from the well-known theoretical considerations.

Any suitable organic polymeric material having a strength when cured capable of resisting the pressures encountered during the indentation step without cracking or crazing can be used as the first layer of transparent material separating the glass beads from the metal substrate. In particular, it has been found that thermosetting polymers are more likely to have the toughness to withstand the pressing operation than thermoplastic polymers. An example is a thermosetting acrylic coating sold under the trade mark DURACRON 100 by Canadian Pittsburgh Industries Ltd. The same material or a different material can be used to form the other transparent layers of the product. The important point is that the first layer (space coat) should be hard and not susceptible to crazing, cracking or excessive attenuation during the indentation step, whereas the layers overlying the beads applied after the indentation step (top coat) need not be as hard but preferably should be able to release their solvent without "popping", i.e., the polymeric material should preferably have a smooth surface when dry.

The transparent adhesive layer is usually quite soft so that it flows upwardly around the beads to some extent during the indentation step thus leaving the tops of the beads less proud from the surface than before the application of pressure. Only a relatively thin top coat is then required to be able to cover the tops of the beads and to form a smooth outer surface. The requirement for a thin top coat is preferred because thinner coats are less prone to "solvent popping" than thicker coats.

The adhesive layer should preferably be as thin as possible to reduce any tendency of the glass beads to form more than a single layer on the adhesive surface.

Additional examples of suitable organic polymeric coating materials are listed as follows. While all of these materials are useful in the invention, some have minor disadvantages as discussed below.

(i) Acryloid B-72 (Trade Mark) and Acryloid B-66 (Trade Mark) manufactured by Rohm & Haas. These thermoplastic materials are useful as top coats but do not meet the strength requirements of the first layer (space coat) subjected to the pressures of the indentation step.

(ii) Automotive lacquers. These materials have very low flash points and require air drying, which has the disadvantage of being slower than oven drying.

(iii) DuPont 1234 (Trade Mark). This material also has a very low flash point and requires air drying.

(iv) Polyester and silicone polyester. These materials are particularly suitable as the space coat and can also be used for the top coats. A suitable solvent formulation can be provided to reduce their tendency to "solvent pop".

(v) U.C. cured resins. These materials are suitable as top coats but tend to be expensive.

(vi) Epoxy coatings. These materials are useful but generally have poor ultraviolet resistance when used outdoors.

(vii) Water-borne acrylic emulsions such as the one sold by Rohm and Haas under the trade mark RHOPLEX E 1230. Such materials are particularly advantageous because their use does not cause environmental pollution.

(viii) Fluorocarbon coatings based on polyvinyl fluoride or polyvinylidene fluoride resins are particularly suitable because of their characteristic good flexibility and durability.

(ix) As top coats, preformed polymer films can be used, eliminating the need for special coating equipment and for drying and/or curing ovens with their associated air pollution problems. These films can be applied by standard laminating techniques employing adhesives coated on the film or the glass beads. They can also be thermally bonded to the beads in a "hot nip" or by melting, without the use of adhesives. Additionally, some thermo plastic materials used as top coats can be applied directly to the substrate in the molten state by standard extrusion coating techniques without the need to form a free film in a separate operation.

The indentation step can be carried out in a press mill or a roller mill, but a roller mill is preferred because this lends itself more readily to continuous processes. Moreover, greater loads are required when the pressure is applied statically because the area of contact is much greater than in a rolling mill. The pressure required is dictated to a large extent by the hardness of the substrate material, and the minimum pressure capable of producing satisfactory indentation is preferably because higher pressures merely increase the possibility of fracture of the beads or polymer layer. In the case of a mill having 4 inch diameter rolls, the loading of the mill usually falls within the range of 140–800 kg/cm of substrate width.

As noted above, the platen may take the form of a sheet of metal, e.g., aluminum, or may be a web of paper or a metal foil such as aluminum foil. Any suitable type of paper or metal foil can be employed, although plastic coated papers should preferably be avoided because the plastic may tend to adhere to the glass particles or press rolls. When paper or a foil is used as the platen, the process can readily be made continuous. For example, known coil coating techniques can be employed and the platen can be supplied to the press rollers from a large roll or the like and can be rewound after passing through the press for disposal or re-use.

The surface of the indentable substrate should preferably be bright before the application of the space coat so that the metal surface forms a good reflector. However, the indentation step results in the formation of bright new metal surfaces within the concave indentations. It has also been found advantageous for the production of a retro-reflective coating with an improved white appearance, to "white-etch" the substrate with the well known appropriate chemicals, as a pretreatment to coating.

The invention will be described further with reference to the following Examples which are not intended to limit the scope of the invention.

In these Examples, the retro-reflectance of samples was measured by using the apparatus shown in FIG. 1. A light source 1, e.g., a photoflood lamp or a spot lamp, shines through a circular aperture having a diameter of 5 cm onto a 10 cm square sample 3 of retro-reflective material. The aperture serves to define the area illuminated and to block out stray light from behind the sample.

The sample is mounted on the axle of a synchronous motor 4 which causes the sample to rotate at 1 rev/minute. Light reflected by the sample in the direction of the light source 1 is caused to fall on a photocell 5. The light source and photocell are mounted 6 meters away from the aperture 2, and the photocell is protected fromm extraneous light sources by a cardboard cylinder 6. The output of the cell is recorded on a suitable pen recorder 7.

To measure the intensity of retro-reflective light the sample is set rotating and the output of the photocell recorded. Zero retro-reflectivity is taken as the light intensity when the sample is perpendicular to the aperture. The back of the sample holder is a specular reflector which can be used to calibrate the chart speed of the recorder with sample angle. Since small changes in optical alignment affect the intensity measurement, a standard reflector sheet is measured for each set of samples.

Example 1

Two samples were prepared from clear (unpigmented) DURACRON 100 (Trade Mark) thermosetting acrylic coating as the organic polymeric material and Flexolite (Trade Mark) spherical glass beads of about 75 microns in diameter and having a refractive index of 2.1.

The samples were made by first applying (by drawdown) a base coat of DURACRON 100 (Trade Mark) on panels of unpretreated mill finish Alcan SW-30 aluminum alloy sheet 0.56 mm thick, and curing it at 260° C. for 2 minutes. A second very thin adhesive coating of DURACRON 100 (Trade Mark) was then applied, allowed to partially dry for about 30 seconds at 205° C., and then "beaded" by dropping on it a copious quantity of the Flexolite (Trade Mark) beads and shaking off those which did not adhere. This procedure produced a single densely populated layer of beads adhering to, and partially embedded in, the surface. The adhesive coat holding the beads was then cured for 2 minutes at 260° C.

A panel of the same aluminum sheet of corresponding size was laid over the beaded surface as a platen and the assembly passed through a sheet rolling mill for a nominal reduction of about 2 percent at a load of about 590 kg/cm of sample width. The platen was then removed and one or more top coats of DURACRON 100 (Trade Mark) were applied and cured for two minutes at 260° C., thus filling in the interstices between the partially imbedded beads and providing a transparent top coat over them.

The approximate dimensions of the various layers in the two samples are given in Table 1 below:

TABLE 1

| Sample | Dry Film Thickness (Microns) | | | |
|---|---|---|---|---|
| No. | Base Coat | Adhesive Coat | Top Coat* | Total |
| 186/3 | 20 | 4 | 29 | 104 |
| 189/2 | 20 | 4 | 42 | 117 |

*The top coat thickness is the dry film thickness that would have been applied with the drawdown bars used had there been no beads adhering to the surface.

Figure 2:
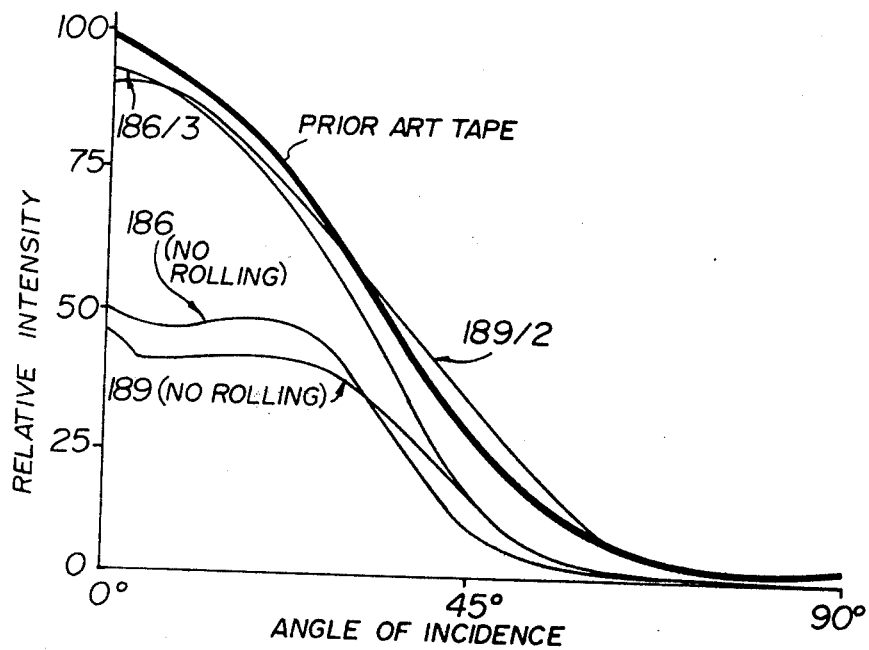
FIG. 2 is a graph showing the relative intensity of reflected light versus the angle of incidence for samples according to the invention and comparison samples.

For comparison, identical samples (designated 186 and 189 respectively) were prepared except that the rolling (indentation) step was omitted. The retro-reflective properties of the rolled and non-rolled constructions is shown in FIG. 2.

Figure 3:
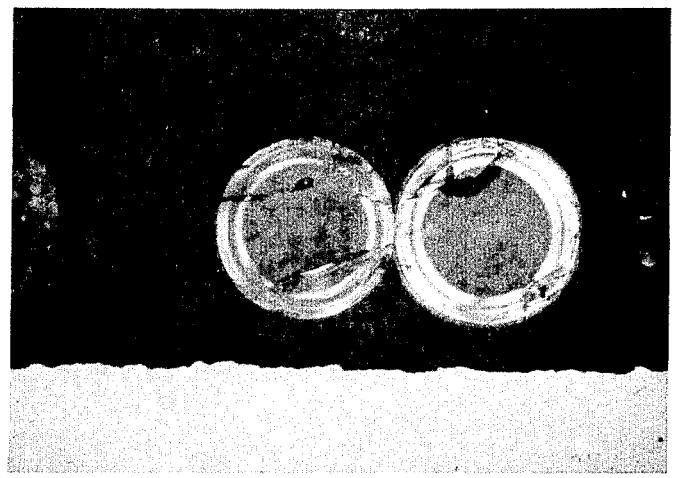
FIG. 3 is a cross-sectional photomicrograph of a non-rolled retro-reflective surface layer.
Figure 4:
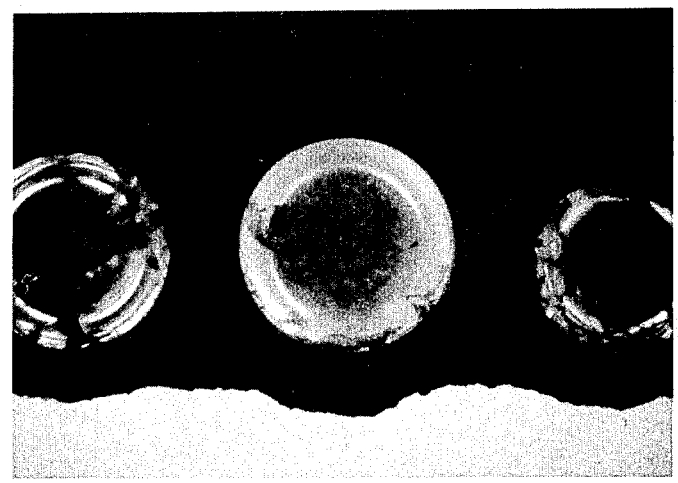
FIG. 4 is a cross-sectional photomicrograph of the retro-reflective surface layer of FIG. 3 after rolling in accordance with the invention.
Figure 5:
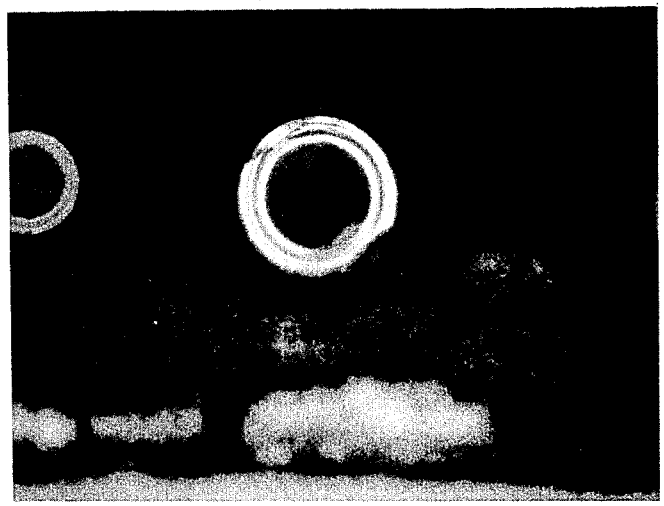
FIG. 5 is a cross-sectional photomicrograph of a prior art retro-reflective tape for comparison.
Figure 6:
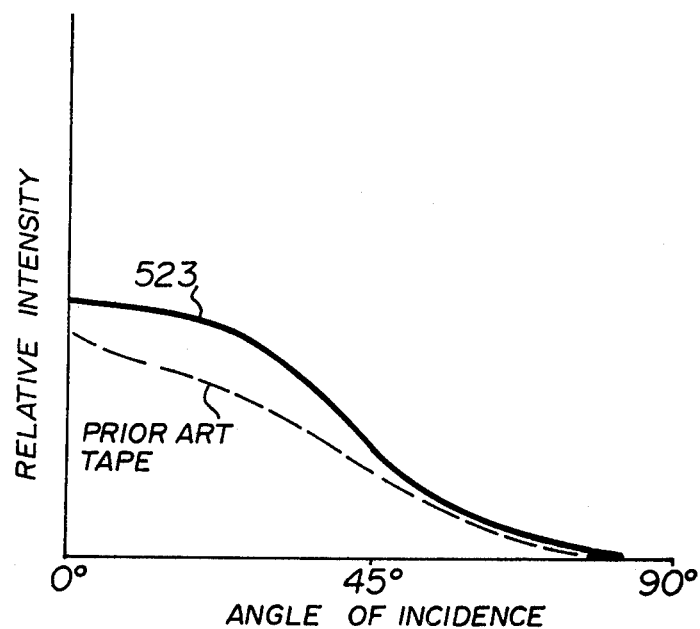
FIGS. 6 to 10 are graphs similar to FIG. 2 showing the reflective properties of samples prepared according to the present invention.
Figure 7:
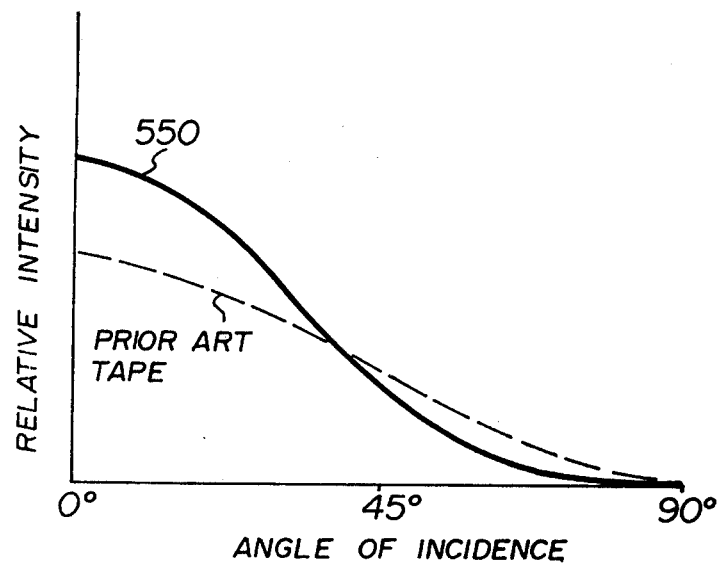
Figure 8:
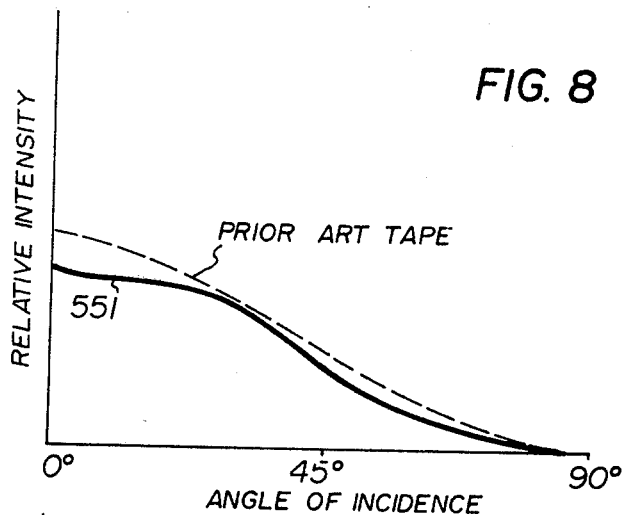
Figure 9:
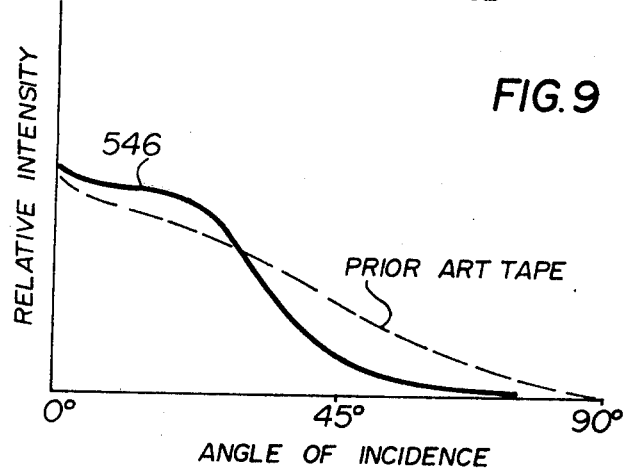
Figure 10:
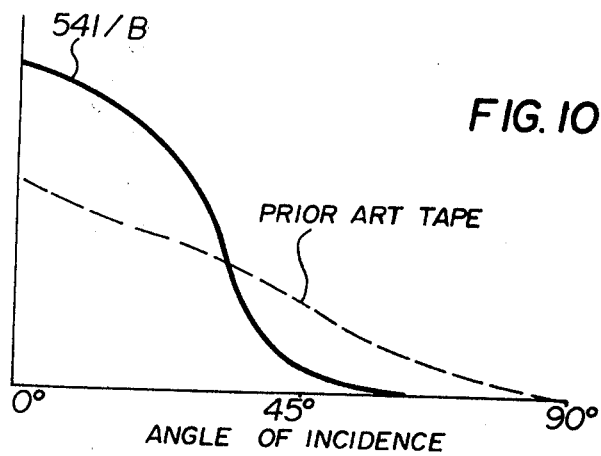

When the coating was removed from samples 186/3 and 189/2 it was readily apparent that the aluminum substrate had been distorted into the form of a concave mirror behind each bead. In confirmation of this, constructions 186 (non-rolled) and 186/3 (rolled) were sectioned and photomicrographed with the results shown in FIGS. 3 and 4, respectively. For purposes of comparison, a similar photomicrograph of a prior art retro-reflecting adhesive tape is shown in FIG. 5.

Of particular interest is that the aluminum substrate has been distorted into conformity with the beads without the base coat having been broken or significantly thinned. That is, the spacing has been maintained while enough conformity has been introduced to make the difference between high and low quality reflectors.

EXAMPLE 2

In this Example, retro-reflective layers were formed in a similar manner to Example 1 on the following substrate metals as noted in Table 2 below and were rolled with the platens and at the pressures also noted in the Table.

TABLE 2

| Sample No. | Alloy, Temper and Thickness | Space Coat | Beads (Refractive Index) | Rolling Mill Load (Kg/cm of sample width) | Platen* |
|---|---|---|---|---|---|
| 523 | Alcan SW-30 H-15 .023 in. | 8μ | 2.28 | 500 | Foil. |
| 550 | Alcan SW-30 H-15 .023 in. | 9μ | 2.32 | 520 | Foil. |
| 551 | AA5454 H-36 .051 in. | 8μ | 2.32 | 700 | Foil. |
| 546 | AA5454 H-34 .051 in. | 8μ | 2.24 | 700 | Foil. |
| 541/B | AA5052 H-34 .051 in. | 14μ | 2.1 | 700 | Foil. |

*All foil platens were 0.0016 in. thick aluminum foil.

All samples formed acceptable retro-reflective layers with properties similar to the best prior art tapes. A 40% higher rolling pressure was required with the harder AA5052 and AA5454 aluminum alloys in order to indent the harder metal.

This Example shows that the harder alloys required for road signs and the like can be made directly retro-reflective by the method of the present invention.

FIGS. 6 to 10 show the retro-reflective properties of these samples compared with those of a commercial grade prior art tape. In the case of some of the alloys, higher intensity of reflection than the prior art tape can be achieved with some sacrifice of reflection at the larger angles.

EXAMPLE 3

In this Example, samples were prepared from Alcan SW-30 aluminum alloy and AA5454 H-36 aluminum alloy starting with a 5 in. × 12 in. × 0.051 in. sheet of the alloy material.

The following method steps were employed in the preparation of the samples:

(a) A space coating of DURACRON 100 (Trade Mark, Canadian Pittsburgh Industries), a thermosetting acrylic polymer, was applied to the sample plate with a drawdown bar to a thickness of 8–10μ, and the coating was cured for 120 seconds at 260° C.;

(b) An adhesive coating of DURACRON 100 (Trade Mark) was applied over the cured layer to a thickness of 5–8μ and was cured for 30 seconds at 205° C.;

(c) Glass beads (refractive index 2.32, diameter 40–50μ, obtained from Wanami Abrasive Company, Ltd., Tokyo, Japan) were sprinkled on the adhesive coating while it was still hot;

(d) The bead coated sheet was cured for 90 seconds at 260° C.;

(e) Each sheet was trimmed to a width of 4 in., and, using a 0.0016 in. thick aluminum foil as a platen, each sheet was passed once through a rolling mill having 4 in. diameter rolls, using a load of 700 kg/cm of sheet width, and the platen removed;

(f) Each sheet then received two top coats of DURACRON 100 (Trade Mark) applied by a spray gun (producing a film which would have a thickness of 25μ if applied to a flat sheet), the second coating being applied immediately after the first coat had been cured at 260° C. for two minutes.

The adhesive coating of step (b) was kept as thin as possible to avoid any "second layer" beads adhering to the samples.

To show the effectiveness of the use of a platen, the samples were each rolled in the 4 in. mill with the platen arranged to cover only half the surface of each sample.

Photomicrographs were made of both surface areas and also of the cross sections. In all cases, the area rolled without the platen showed fractured beads, while the panel area protected by the platen showed the beads intact.

Figure 11:
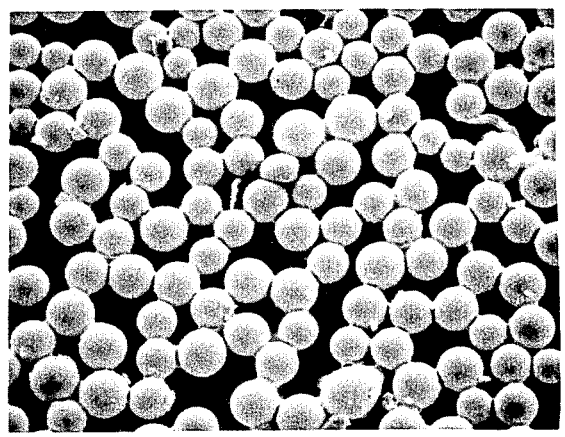
FIG. 11 is a photomicrograph of the surface of a retro-reflective layer on an Alcan SW-30 alloy rolled with a platen.
Figure 12:
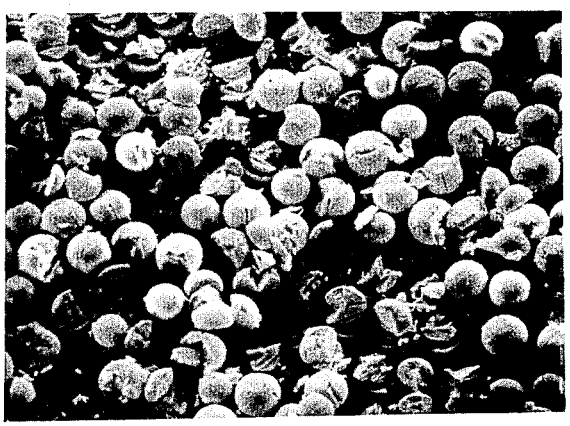
FIG. 12 is a photomicrograph of the same retro-reflective layer of FIG. 11 rolled without a platen.
Figure 13:
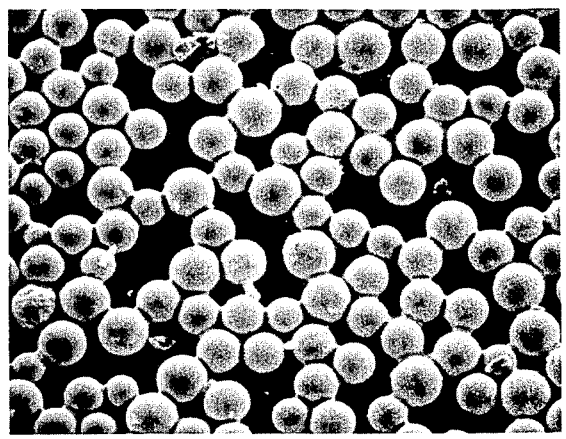
FIG. 13 and FIG. 14 are photomicrographs similar to FIGS. 11 and 12, respectively, showing retro-reflective layers formed on AA5454 aluminum alloy.

The photomicrographs of the samples prepared in this manner are shown in FIGS. 11 to 14, wherein FIG. 11 shows the surface of an Alcan SW-30 alloy sheet coated with beads and rolled with the protection of a platen;

FIG. 12 shows the same Alcan SW-30 alloy rolled without the protection of a platen;

FIG. 13 shows an AA5454 alloy rolled with a platen; and

Figure 14:
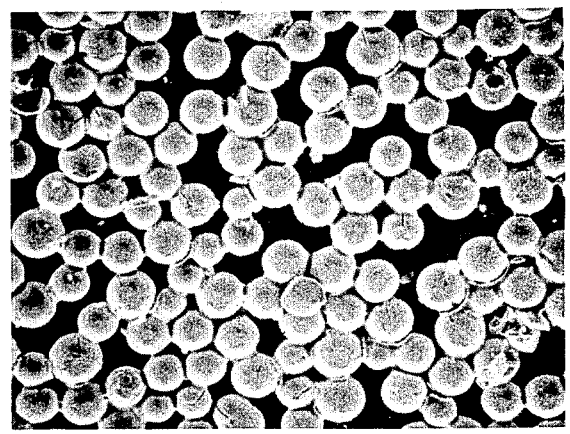

FIG. 14 shows the same alloy rolled without a platen.

All of the photomicrographs were taken at 160 times magnification.

Figure 15:
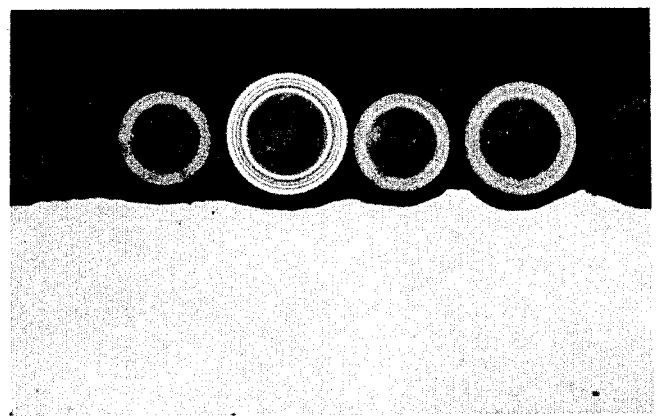
FIGS. 15 and 16 are cross-sectional photomicrographs of retro-reflective layers formed on AA5454 aluminum alloy rolled with and without a platen, respectively.
Figure 16:
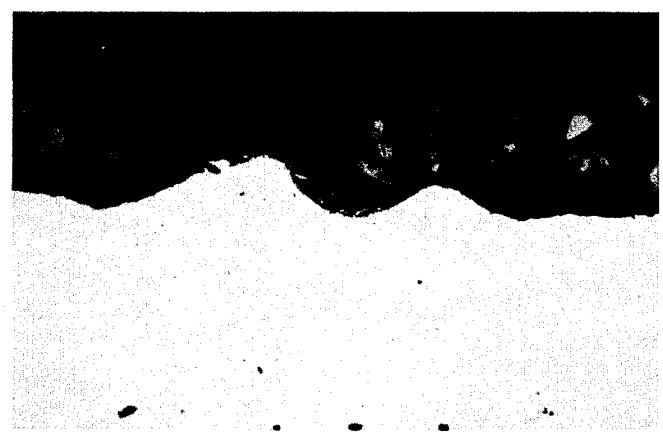

Cross-sectional photomicrographs also show the benefit of using a platen. These are shown in FIGS. 15 and 16, in which;

FIG. 15 shows the effect of rolling an AA5454 alloy with a platen;

FIG. 16 shows the effect of rolling the same AA5454 alloy without a platen.

Both these photomicrographs were taken at 400 times magnification.

These photomicrographs speak for themselves. It is clear from them that in all cases damage and dislocation of the glass beads results when rolling is effected without a platen, but this can substantially be avoided when a platen is used.

EXAMPLE 4

In this Example, samples were prepared in a similar manner to Example 3.

The samples were rolled using platens of different weight and quality of paper and foil to determine their effect on the retro-reflective properties.

The alloy used for the samples was Alcan SW-30 (H-15 temper, 0.023 in. thick). The thickness of the coating between the beads and the substrate was 8μ. The beads had a refractive index of 2.28 and the rolling mill load applied was 500 kg/cm of sample width.

Figure 17:
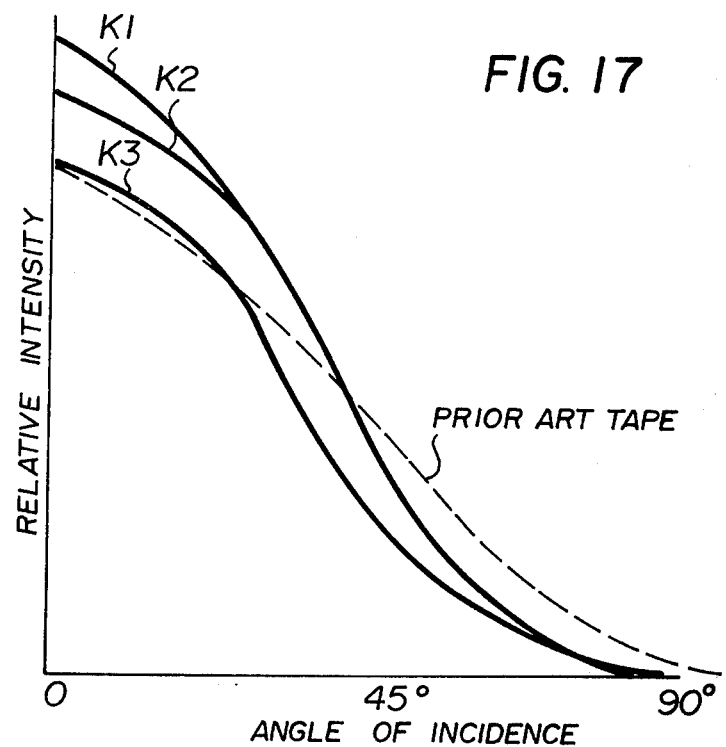
FIGS. 17 and 18 are graphs similar to FIG. 2 showing the reflective properties of various samples produced according to the invention using various types of foil as the platen.
Figure 18:
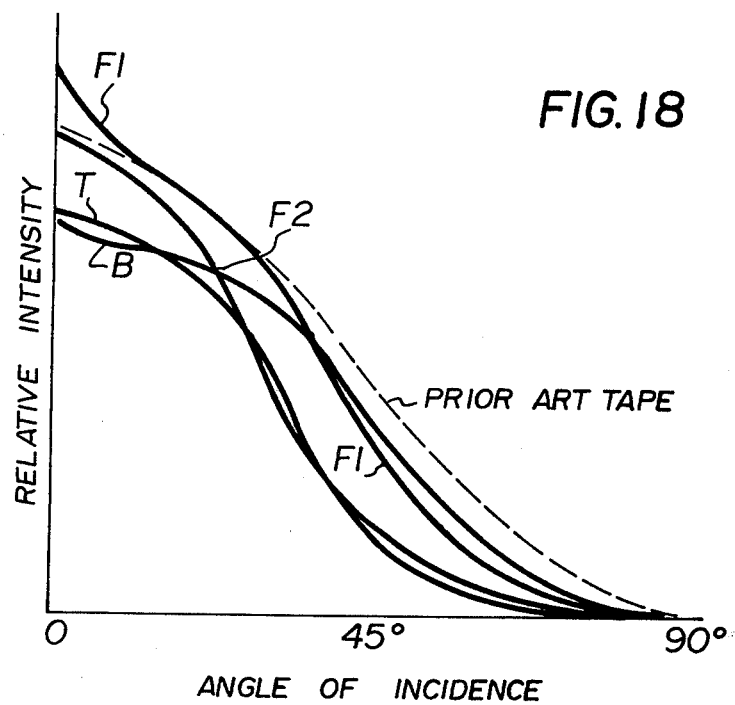

The reflective properties of the resulting samples are shown in FIGS. 17 and 18, in which the dotted lines represent a commercial prior art tape and the curve references indicate the foil platens shown below K1—Freezer paper (0.004 inches)
K2—Kraft 10 lbs. (0.0025 inches)
K3—Wrapping paper (0.003 inches)
T—Tracing paper (100% rag, 0.0025 inches thick)
B—Bond paper (100% rag, 0.005 inches)
F1—Aluminum container foil (0.0056 inches thick)
F2—Aluminum converter foil (0.0016 inches thick)

It can be seen from the graphs that no significant difference can be attributed to the type or quality of platen. However, it is desirable to have stronger paper or foil when using higher pressures.

EXAMPLE 5

A pretreated panel of Alcan SW-30 aluminum (size 4 inches ×10 inches ×0.022 inches) was coated with 8μ of clear thermosetting acrylic lacquer and cured. A second coat of 8μ acrylic served as an adhesive for the glass beads having a refractive index of 2.28 (size 53 to 63) which were dusted on the adhesive layer to form a single, densely populated layer. The beaded panel was then cured.

Aluminum foil (0.0016 inch thick) of the same size as the panel was placed on top of the beaded surface and fed into a rolling mill loaded sufficiently to produce a 2% reduction in thickness at a load of about 590 kg/cm of sample width.

The panel was removed and was coated with 25μ of clear acrylic lacquer.

Figure 19:
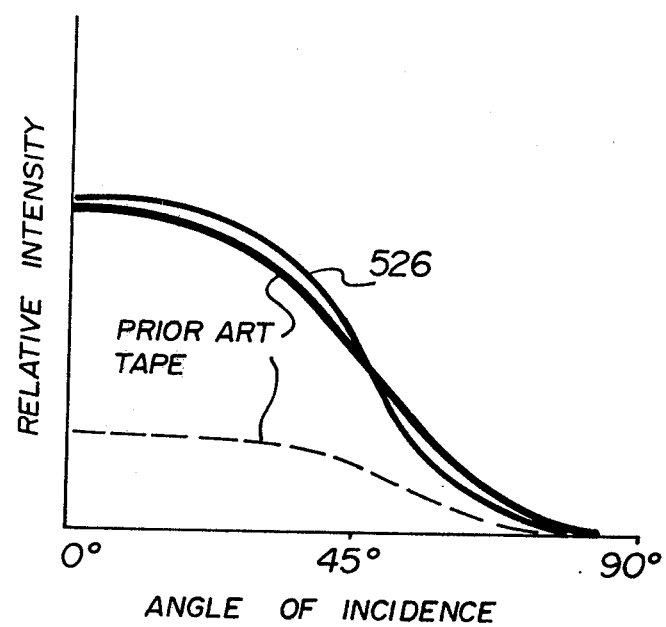
FIG. 19 is a graph similar to FIG. 2 showing the retro-reflective properties of the sample of Example 5 and two prior art tapes.

The retro-reflective properties of the beaded coated sheet thus produced (designated sample 526) are shown in FIG. 19 and compared with two commercially available retro-reflective tapes.

As can be seen from the graph, the product of this Example compares favourably with the better of the two commercially available tapes.

We claim:

1. A method of forming a retro-reflective surface on an indentable metal substrate, comprising the steps of:
    (a) forming on said indentable metal substrate a layer of transparent organic polymeric material having a mono-layer coating of substantially spherical glass beads of high refractive index;
    (b) covering said beads with a platen having substantially no tendency to adhere to the glass beads under the pressures encountered;
    (c) applying sufficient pressure to said platen and indentable metal substrate to cause the glass beads to indent the surface of said indentable metal substrate; and
    (d) covering said beaded layer with a further layer of transparent organic polymeric material;
said transparent organic polymeric material formed on the indentable metal substrate in step (a) being suitable to withstand the pressure of step (c) without substantial crazing, cracking or attenuation, and the thickness of said layer being sufficient to space said beads from said substrate by a predetermined distance suitable for retro-reflection after step (c).

2. A method according to claim 1 wherein the platen is flexible metal plate or sheet.

3. A method according to claim 1 wherein the pressure is applied by passing the substrate and platen through a roller mill.

4. A method according to claim 3 wherein the mill applies a load within the range of 140–800 kg/cm of the substrate width during the rolling operation.

5. A method according to claim 1 or claim 3 wherein the platen is a paper web.

6. A method according to claim 1 or claim 3 wherein the platen is a metal foil.

7. A method according to claim 1, claim 2 or claim 3 which comprises employing a material selected from the following group as the indentable metal substrate material, said group consisting of aluminum alloys designated AA1100 and AA5454, an Al-½% Mn alloy, and zinc-coated, iron-base materials.

8. A method according to claim 1, claim 2 or claim 3 wherein a thermosetting polymeric material is employed as the layer applied to said substrate in step (a).

9. A method according to claim 1, claim 2 or claim 3 wherein the polymeric material of step (a) is an acrylic resin which is applied to the substrate in the form of an aqueous emulsion.

10. A method of preparing a retro-reflective surface on an indentable metal substrate, which comprises:
   (a) forming a layer of transparent organic polymeric material on the indentable metal substrate;
   (b) applying a layer of transparent adhesive to the polymeric layer;
   (c) forming a mono-layer of spherical glass beads of high refractive index on the adhesive layer;
   (d) covering the layer of beads with a platen;
   (e) applying sufficient pressure to the platen to cause the glass beads to indent the surface of the substrate; and
   (f) covering the coating of beads with a further layer of transparent polymeric material.

11. In a method of preparing a retro-reflective surface on an indentable metal substrate, the steps of:
   (a) disposing on said substrate a layer of transparent material, a mono-layer of glass beads of high refractive index adhered to the transparent material, and a platen over the layer of beads;
   (b) applying sufficient pressure to the platen to cause the beads to indent the surface of the substrate; and
   (c) removing the platen while leaving the beads adhered to the transparent material and spaced from the substrate by a distance, of transparent material, suitable for retro-reflection.

12. A method according to claim 11 in which the beads are adhered to the aforesaid transparent material by providing an intermediate layer of transparent adhesive.

13. A method according to claim 11 or claim 12 which includes providing a further layer of transparent material over the layer of beads.

* * * * *